Oct. 8, 1940.   R. R. CRUM   2,216,938

ROLLER CUTTER

Filed Sept. 12, 1938

INVENTOR
Roland R. Crum
BY *John Flam*
ATTORNEY

Patented Oct. 8, 1940

2,216,938

UNITED STATES PATENT OFFICE 2,216,938

ROLLER CUTTER

Roland R. Crum, Whittier, Calif.

Application September 12, 1938, Serial No. 229,574

8 Claims. (Cl. 255—71)

This invention relates to a roller cutter for use on well drilling bits. Cutters for such purposes have been in common use, and they are shown and described for example in a prior application filed on January 23, 1937, by Roland R. Crum, having Serial Number 122,022 now Patent No. 2,143,909, granted January 17, 1939, and entitled: "Roller bit structure."

This structure includes a bit frame with appropriate rotary supports for the cutters. The frame is arranged to be carried at the end of a rotary drill string. One or more inner cutters are used, arranged for free rotation about axes radial to the drill string axis, for cutting along the center portion of the bore bottom. These cutters may be supplemented by outside cutters, usually of disc form, adapted to operate on an outer zone. During the process of drilling, a mud fluid circulation is maintained by way of an aperture extending through the drill string and past the cutters. This circulation is intended, among other things, to keep the rows of teeth of the cutters free from the disintegrated matter removed by the bit.

It is one of the objects of this invention to make it possible to circulate the mud fluid more easily past the teeth of the inner cutters.

It has been common to provide teeth for inner cutters arranged in a series of separate, annular rows. The spaces between the annular rows are necessarily quite restricted, for it is obviously desirable to have as much of the toothed area in contact with the hole bottom as possible. However, such spaces are readily clogged or balled up with the bore cuttings. It is another object of this invention so to arrange the teeth that they are effective in operating on the bore bottom, and yet do not readily accumulate any foreign matter, but instead, the circulating mud fluid can maintain the teeth clean.

This object is attained by forming the teeth in general helical like rows; and preferably in the form of multiple threads. Thus the successive teeth have a progressive radial action on the bore bottom; and the space between adjacent teeth may be quite large.

In forming one or more helical-like rows of teeth, it is readily seen that those teeth which approach the end surface of the cutter are successively abbreviated to form thin teeth, one surface of which is coincident with the plane defining said end surface. The last several teeth may become so thin as to have no material value for cutting or boring. It is another object of this invention to reinforce these end teeth by building up their cutting edges so that these edges extend entirely to the plane defining the end of the cutter. In this way, the cutters are effective over the bottom of the bore, from the axis of the rotary drill to the outer end surface of the cutter.

This invention possesses many other advantages, and has other objects which may be made more easily apparent from a consideration of one embodiment of the invention. For this purpose there is shown a form in the drawing accompanying and forming part of the present specification. This form will now be described in detail, illustrating the general principles of the invention; but it is to be understood that this detailed description is not to be taken in a limiting sense, since the scope of this invention is best defined by the appended claims.

Referring to the drawing.

The roller cutter is shown as having a body 1. This body 1 tapers from a large end 2 to a small end 3. It is provided with a through aperture to permit it, as well as another inner cutter of the same construction, to be supported in the manner illustrated in the application hereinbefore identified; that is, on a pin extending diametrically with respect to the axis of the drill bit, and across the bottom of the bit. The smaller end 3 of each of the two cutters is disposed adjacent the axis of the bit.

Teeth 4, 5, etc. are arranged on the outer surface of the body 1. These teeth are formed by sloping sides converging to a sharp top edge or point 6.

Figure 2:
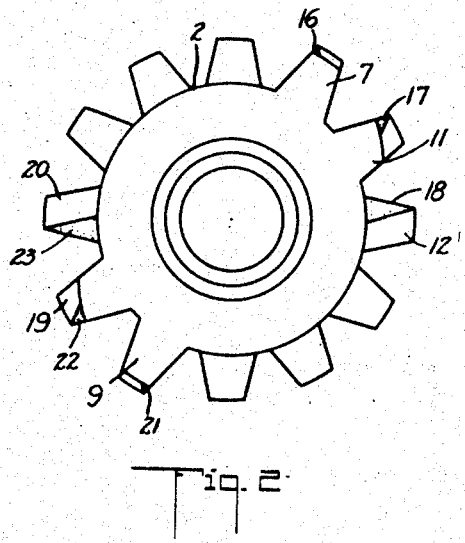
Fig. 2 is an end view taken from the left hand end of Fig. 1.

In order that there may be adequate spacing between the teeth 4, 5, etc. these teeth are arranged in helical-like rows, about the axis of rotation of the cutter body. In the present instance, two separate helical-like rows, forming a multiple thread-like conformation are illustrated, although single threads or any other multiple thread arrangement may be used. At any rate, one helical-like row, for example, may begin with the tooth 7 at the large end of the body 1 and ends with the tooth 8 at the small end 3 of the body 1. As illustrated most clearly in Fig. 2, another helical-like row begins at the tooth 9 diametrically opposite the tooth 7 and finally ends with the tooth 10 at the small end 3.

Due to this arrangement, the teeth may be kept rather widely spaced, giving a free course for the circulation of mud fluid between the teeth and preventing material balling up. At the same time the teeth in each helical-like row act in succession upon the bottom of the bore, to disintegrate the material.

Figure 1:
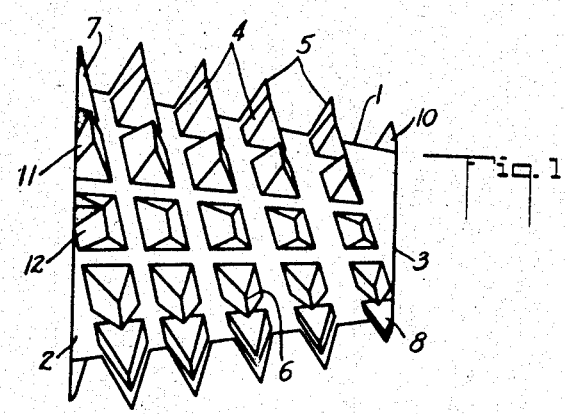
Figure 1 is an elevation of a roller cutter embodying the invention.
Figure 3:
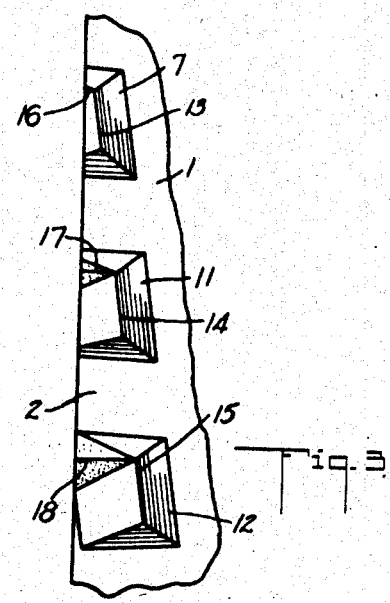
Fig. 3 is a fragmentary enlarged view of the end portion of the cutter, shown in developed form.

As shown most clearly in Fig. 1, the teeth such as 7, 11, and 12, adjacent the end 2 of the cutter, are not complete teeth, their sides being abbreviated by the plane normal to the axis of the cutter structure and defining the large end 2 thereof. In order to strengthen these teeth and to ensure that the cutter will be active along the entire length, and to the large end 2 of the cutter, the points 13, 14 and 15 of these abbreviated teeth are treated in a special way. This is disclosed most clearly in Fig. 3. Thus for example, the cutting edge 13 of tooth 7 may be provided with an extension 16, transverse to the end 2 and joining the edge 13. This extension 16 has sloping sides terminating at the height of the edge 13.

As regards tooth 11, the same treatment is provided. The cutting edge 14 has an extension 17 transverse thereto and extending to the end 2. Similarly, the cutting edge 15 of tooth 12 has a similar extension 18. These extensions may be formed conveniently by building up these teeth by hard facing material, such as "Stellite" or a tungsten carbide compound.

The teeth 9, 19 and 20 diametrically opposite from teeth 7, 11 and 12 may be similarly built up as indicated by the shaded areas 21, 22 and 23.

These extensions formed of the hard facing material serve to reinforce the narrow teeth where the helical rows begin, and also ensure that the cutter structure will be effective for its entire length, up to the surface defining the large end 2.

What is claimed is:

1. In a rotary cutter for drill bits, a cutter body, and a row of cutter teeth thereon in helical-like formation with respect to the axis of the body, said teeth having sides converging to form cutting edges, the teeth adjacent the end of the row each having one side at least partly defined by a continuation of the end surface of the cutter body, said end teeth each having an extension of the cutting edge in a direction transverse to said cutter end surface and to the said cutting edge.

2. In a rotary cutter for drill bits, a cutter body, a row of cutter teeth thereon in helical-like formation with respect to the axis of the body, said teeth having sides converging to form tooth points, the teeth adjacent the end of the row each having one side at least partly defined by a continuation of the end surface of the cutter body, and hard facing material forming an extension of each of said end teeth in a direction transverse to said cutter end surface and to the direction of the row.

3. In a roller cutter for drill bits, a cutter body, a row of cutter teeth thereon in helical-like formation with respect to the axis of the body, said teeth having sides converging to form cutting edges, each of the teeth adjacent the end of the row having one side at least partly defined by a continuation of the end surface of the cutter body, and a reenforcement for each of said end teeth, comprising a body of hard facing material on the tooth, having converging sides forming a cutting edge extending from the helical cutting edge of the tooth to said continuation of the end surface of the cutter body and transverse to said surface as well as to said helical cutting edge.

4. In a roller cutter for drill bits, a cutter body, a row of cutter teeth thereon in helical-like formation with respect to the axis of the body, said teeth having sides converging to form cutting edges, each of the teeth adjacent the end of the row having one side at least partly defined by a continuation of the end surface of the cutter body, and reenforcing means for each of said end teeth, said means also forming a cutting edge extending from the helical cutting edge of the tooth to said continuation of the end surface of the body.

5. In a roller cutter for drill bits, a cutter body, and a row of cutter teeth thereon arranged in helical-like formation with respect to the axis of the body, said teeth having cutting edges of substantial length in the direction of the helical-like row, there being uninterrupted channels extending from end to end of the body and intersecting the said row, adjacent sides of neighboring channels serving to define the sides of said teeth.

6. In a roller cutter for drill bits, a tapered cutter body, and a row of cutter teeth thereon arranged in helical-like formation with respect to the axis of the body, said teeth having cutting edges of substantial length in the direction of the helical-like row, there being uninterrupted channels extending from end to end of the body along elements of the surface of the body.

7. In a roller cutter for drill bits, a cutter body, and a row of cutter teeth thereon, said row being arranged in screw-thread-like formation, said teeth having cutting edges of substantial length in the direction of the row, the pitch-angle of the thread of said formation being such that said thread makes substantially more than a complete turn in the length of the body.

8. In a roller cutter for drill bits, a tapered cutter body, and a plurality of rows of cutter teeth thereon, said rows being arranged in multiple screw-thread-like formation, said teeth having cutting edges of substantial length in the direction of the row, the pitch angle of the threads of said formation being relatively small, so that at least one of said threads makes substantially more than a complete turn in the length of the body, there being uninterrupted channels extending from end to end of the body along elements of the surface of the body.

ROLAND R. CRUM.